United States Patent
Gruffaz

(10) Patent No.: US 9,343,894 B2
(45) Date of Patent: May 17, 2016

(54) METHOD AND DEVICE FOR MONITORING A DEVICE EQUIPPED WITH A MICROPROCESSOR

(75) Inventor: Franck Gruffaz, Seyssins (FR)

(73) Assignee: Schneider Electric Industries SAS, Rueil-Malmaison (FR)

(*) Notice: Subject to any disclaimer, the term of this patent is extended or adjusted under 35 U.S.C. 154(b) by 551 days.

(21) Appl. No.: 13/312,091

(22) Filed: Dec. 6, 2011

(65) Prior Publication Data

US 2012/0150492 A1    Jun. 14, 2012

(30) Foreign Application Priority Data

Dec. 14, 2010   (FR) .................................... 10 04867

(51) Int. Cl.
| | | |
|---|---|---|
| *G06F 11/30* | (2006.01) | |
| *H02H 3/05* | (2006.01) | |
| *H02H 7/26* | (2006.01) | |
| *H02H 1/00* | (2006.01) | |
| *H02H 3/04* | (2006.01) | |
| *H02H 3/093* | (2006.01) | |
| *G06F 11/27* | (2006.01) | |

(52) U.S. Cl.
CPC ................. *H02H 3/05* (2013.01); *G06F 11/27* (2013.01); *H02H 1/0007* (2013.01); *H02H 3/044* (2013.01); *H02H 3/0935* (2013.01); *H02H 7/263* (2013.01)

(58) Field of Classification Search
CPC ....... H02H 3/05; H02H 7/263; H02H 1/0007; H02H 3/044; H02H 3/0935
USPC ............... 702/186, 86; 706/47; 712/202, 225; 714/777, 727, 736
See application file for complete search history.

(56) References Cited

U.S. PATENT DOCUMENTS

| | | | |
|---|---|---|---|
| 4,780,787 A | | 10/1988 | Dano et al. |
| 5,379,302 A | * | 1/1995 | Andrews ....................... 714/727 |
| 5,572,572 A | * | 11/1996 | Kawan et al. ............... 379/90.01 |
| 5,793,657 A | * | 8/1998 | Nemoto ........................ 708/402 |
| 5,999,629 A | * | 12/1999 | Heer et al. ....................... 705/51 |
| 6,422,470 B1 | * | 7/2002 | Bole et al. ..................... 235/487 |
| 7,132,934 B2 | * | 11/2006 | Allison, III ............. B60R 22/48 |
| | | | 307/10.6 |
| 7,177,129 B2 | | 2/2007 | Arenz et al. |
| 7,251,551 B2 | * | 7/2007 | Mitsueda et al. ............ 701/29.2 |
| 7,596,743 B2 | * | 9/2009 | Goma et al. .................. 714/777 |
| 8,239,340 B2 | * | 8/2012 | Hanson ........................... 706/47 |
| 8,666,924 B2 | * | 3/2014 | Hanson ........................... 706/47 |
| 2002/0144176 A1 | | 10/2002 | Smith |
| 2005/0085967 A1 | * | 4/2005 | Mitsueda et al. ............... 701/36 |
| 2007/0277070 A1 | * | 11/2007 | Janke et al. .................. 714/736 |
| 2009/0259612 A1 | * | 10/2009 | Hanson ........................... 706/47 |

FOREIGN PATENT DOCUMENTS

| | | |
|---|---|---|
| DE | 199 27 030 A1 | 12/2000 |
| FR | 2 602 618 | 2/1988 |
| JP | 5-207637 A | 8/1993 |

* cited by examiner

*Primary Examiner* — Carol S Tsai
(74) *Attorney, Agent, or Firm* — Steptoe & Johnson LLP

(57) ABSTRACT

A method of monitoring a device which is equipped with a microprocessor, which method includes computation in the microprocessor on input data; performing a logic operation by logic gates in an external monitoring device on the same input data; comparing the results of the computation and the logic operation, and deriving from the compared results a diagnostic of the microprocessor, and optionally then switching the microprocessor to a backup safety mode. A device for carrying out such monitoring is also described.

16 Claims, 4 Drawing Sheets

METHOD AND DEVICE FOR MONITORING A DEVICE EQUIPPED WITH A MICROPROCESSOR

CROSS-REFERENCE TO RELATED APPLICATION

This application claims the benefit of the filing date of French Patent Application No. 10 04867, filed Dec. 14, 2010.

BACKGROUND OF THE INVENTION

The present invention relates to a monitoring device for a microprocessor designed for operation within a system equipped with a microprocessor, safety of which is an important parameter. It also relates to a system comprising at least one microprocessor and equipped with such a monitoring device, this system being able to function as a circuit breaker for an electric installation. Finally, it relates to a method for monitoring a microprocessor enabling establishment of a diagnostic of operation of the microprocessor.

It is common practice to equip a device comprising a microprocessor with a time-based monitoring device, also called watchdog. The function of such a monitoring device is to detect a possible anomaly of sequencing of the microprocessor in order to trigger a safety intervention, such as reset of the microprocessor or switching of the device to a safety configuration. The function of the watchdog is therefore to respond to certain dysfunctionings of the microprocessor which could lead to a dangerous, unsafe situation.

But such a device proves insufficient when a higher functional safety level is necessary, in particular when it is necessary to check the functional integrity of the microprocessor in performing safety functions. A first solution consists in using a second microprocessor dedicated to monitoring of the main microprocessor, the latter generally being unable to perform self-testing with a sufficient test coverage. However, such a solution is costly in both product manufacturing cost and development cost, and cumbersome as it requires a large space location on a printed circuit to add the additional microprocessor. Due to its complexity, such a solution further results in making the product less dependable.

French patent document FR2602618 illustrates a solution in which a watchdog monitors periodic performance of data processing controlled by a microprocessor for a circuit breaker of an electric installation. Such a microprocessor performs a certain number of digital processing operations on the electric signals of an electric installation, and generates a circuit breaker tripping order when certain predefined thresholds are reached. The microprocessor thus performs an essential function for safety of the system, and malfunctioning of the microprocessor would lead to a very risky situation for the monitored electric installation. To minimize such malfunctioning, the watchdog monitors any disturbances that may occur, which it detects in delays of a periodic cycle of a periodic operation the microprocessor has to perform. The watchdog can thus detect malfunctionings of the microprocessor: in such a situation, it transmits a re-initialization order to the microprocessor, and if this intervention does not solve the problem and is not accompanied by normal restart of the periodic cycle managed by the microprocessor, the watchdog then transmits a circuit breaker tripping order to place the electric installation in a safety configuration, because its circuit breaker is faulty. However, such a solution does not enable all the malfunctionings of the microprocessor to be detected, certain malfunctions of the microprocessor being able not causing any repercussion on the periodic cycle being monitored. This approach can therefore be improved.

SUMMARY OF THE INVENTION

An object of the invention is therefore to propose a solution for monitoring operation of a microprocessor that does not present all or part of the drawbacks of the state of the art.

More precisely, an object of the invention is to propose a solution for monitoring operation of a microprocessor that is dependable, inexpensive, and is not voluminous.

A monitoring method of a device equipped with a microprocessor according to the invention comprises:
performance of at least one computation in the microprocessor from input data;
performance of at least one logic operation by logic gates in an external monitoring device from the same input data;
comparison of the results of at least one computation performed in the microprocessor with the results of at least one logic operation performed in the monitoring device to deduce therefrom a diagnostic of the microprocessor and/or a command to switch to a safe configuration.

The monitoring method preferably further comprises:
determination of the input data at the level of the microprocessor in the form of variable values corresponding to a certain number of predefined values;
transmission of these values to the monitoring device by communication means.

Advantageously, the step of determination of the input data comprises random generation of the variable values and/or extraction and/or combination of variable values from data bits coming from outside and received by the microprocessor.

Advantageously, the step of determination of the input data comprises determination of the value of several numbers at least one bit of which is variable and takes a value equal to one of the variable values.

Advantageously, the step of performing at least one computation in the microprocessor comprises calculations such as divisions, multiplications, square roots, or raising to the square, between the numbers.

Preferably, the monitoring method comprises a step of determining at least one bit representing the results of the at least one computation performed by the microprocessor, and a transmission step of this at least one bit to the monitoring device.

Advantageously, the step of performing at least one computation in the microprocessor is performed by software of the diagnostic unit of the microprocessor.

Advantageously, performance of at least one logic operation in the monitoring device comprises operations on variable values.

Preferably, the monitoring device comprises comparison of the variable values from at least one XOR gate in the monitoring device in order to obtain results on a single bit dependent on the equality or the difference of the compared variable values.

Advantageously, the comparison step comprises generation of a boolean a first value of which represents a normal state of the device equipped with a microprocessor and a second value of which represents a malfunctioning state.

Preferably, the monitoring method comprises a step of actuation of the device to place the latter in a safety configuration when its microprocessor is in a malfunctioning state.

The monitoring device for a device equipped with the microprocessor according to the invention comprises at least one input to receive data from a microprocessor, a hardwired logic unit to perform logic operations on data coming from the microprocessor, a comparator unit to compare the result of a computation performed by a microprocessor with a result obtained by the hardwired logic unit, and an output to transmit the signal representing the result of the diagnostic of operation of the microprocessor.

Preferably, its hardwired logic unit and its comparator unit comprise logic gates of OR, NOR, AND, NAND, XOR and/or XNOR type.

A system according to the invention comprising a microprocessor comprises an external monitoring device, as defined above, connected by at least one communication means with the microprocessor, and the microprocessor comprises a diagnostic unit which performs at least one computation of the monitoring method, as defined above.

Preferably, the system is an electric circuit breaker, an electric installation monitoring system, or a safety controller.

BRIEF DESCRIPTION OF THE DRAWINGS

These objects, features and advantages of the present invention are described in more detail in the following description of embodiments of the invention as non-restrictive examples in conjunction with the appended drawings, wherein.

DETAILED DESCRIPTION

The concept of the invention is in using a monitoring device for a microprocessor comprising a discrete or integrated hardwired logic unit which enables certain logic operations to be executed very simply, the results of which are compared with the results obtained by performance of related calculations in parallel by the microprocessor to be monitored. This comparison enables an operating diagnostic of the microprocessor to be deduced therefrom, and as a further result the system to be switched to a backup safety position.

Figure 1:
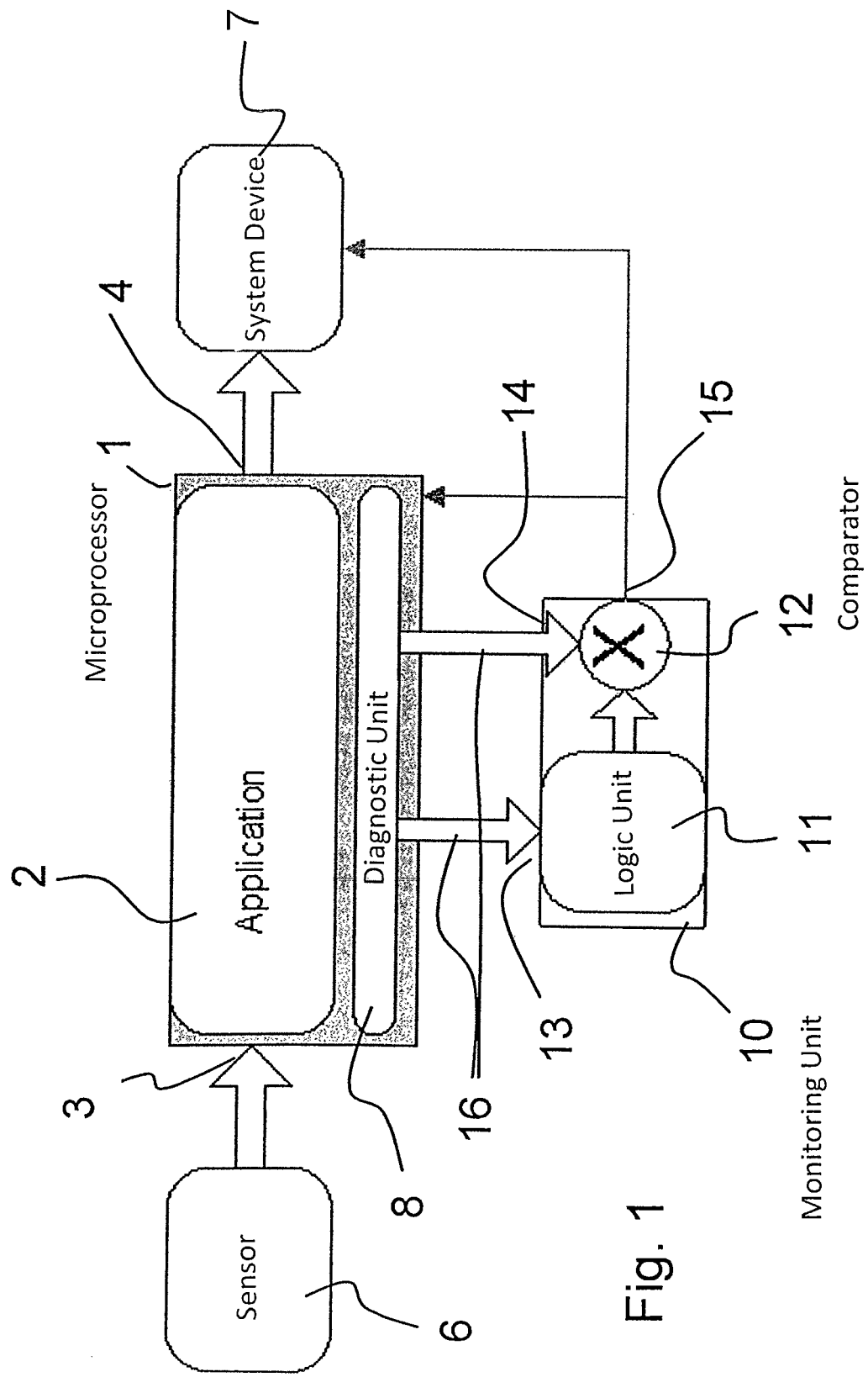
FIG. 1 schematically represents a system equipped with a monitoring device of a microprocessor, according to the invention.

FIG. 1 schematically illustrates an implementation of the monitoring solution according to the concept of the invention. The system comprises a microprocessor 1 to be monitored, and a monitoring device 10 distinct from the microprocessor 1.

The system therefore comprises a microprocessor 1 which participates in implementing a certain application requiring a high functional safety level by means of software 2, from data received on input 3, for example coming from sensor measurements and/or any other device 6 and transmitted to the microprocessor 1 by any communication means. This enables output data and/or commands of a certain device 7 to be generated on output 4, such as tripping or not in the case of a circuit breaker, or an alarm in the context of monitoring equipment, or a command in the case of automated safety systems. Finally, the microprocessor 1 performs connected computations by a diagnostic unit 8, on the basis of a software task dedicated to the maintenance method of the microprocessor 1 or integrated in the application 2, and communicating with the monitoring device 10.

According to the invention, the system therefore comprises a monitoring device 10 which comprises a first input 13 provided for connection with the microprocessor 1, to receive first data from the microprocessor 1, and a second input 14 for connection with the microprocessor 1, to receive second data from the microprocessor 1 via communication means 16. The two inputs 13, 14 have been represented as being distinct, but can physically correspond to one and the same input. The monitoring device 10 further comprises a set of elementary components forming a hardwired logic unit 11 and a comparator unit 12, and an output 15 to transmit a signal representing the result of the diagnostic of the microprocessor 1 and enabling the system to be switched to a backup safety position.

Operation of this system will now be explained. In parallel to its main function, enabling it to execute a certain application by means of a first software 2, the microprocessor 1 performs a software task in its diagnostic unit 8 in cooperation with an independent external monitoring device. For this, the microprocessor transmits input data to the monitoring device 10, and performs a computation from this input data which generates a first result also transmitted to the monitoring device 10 via its second input 14. In parallel, the monitoring device 10 uses the input data received on its first input 13 to perform operations by means of its hardwired logic unit 11, the second result of which obtained in this manner must be the same as that obtained by the diagnostic unit 8 of the microprocessor 1 when this microprocessor 1 is operating correctly. The comparator unit 12 of the monitoring device receives the first result from the hardwired logic unit, and the second result from the microprocessor 1, performs comparison of these two results, and supplies on output 15 a signal representing the diagnostic of the microprocessor 1 on the basis of this comparison. In the case of a malfunctioning microprocessor 1, this output signal represents, for example, a command to switch to a backup safety position thereby ensuring that the system whose safety is involved is placed in a safety configuration. This output signal also represents, for example, an alarm signal enabling the safety of the system whose safety is involved to be transferred to another external safety device so that the other safety device can perform all or part of the safety functions involved.

Figure 2:
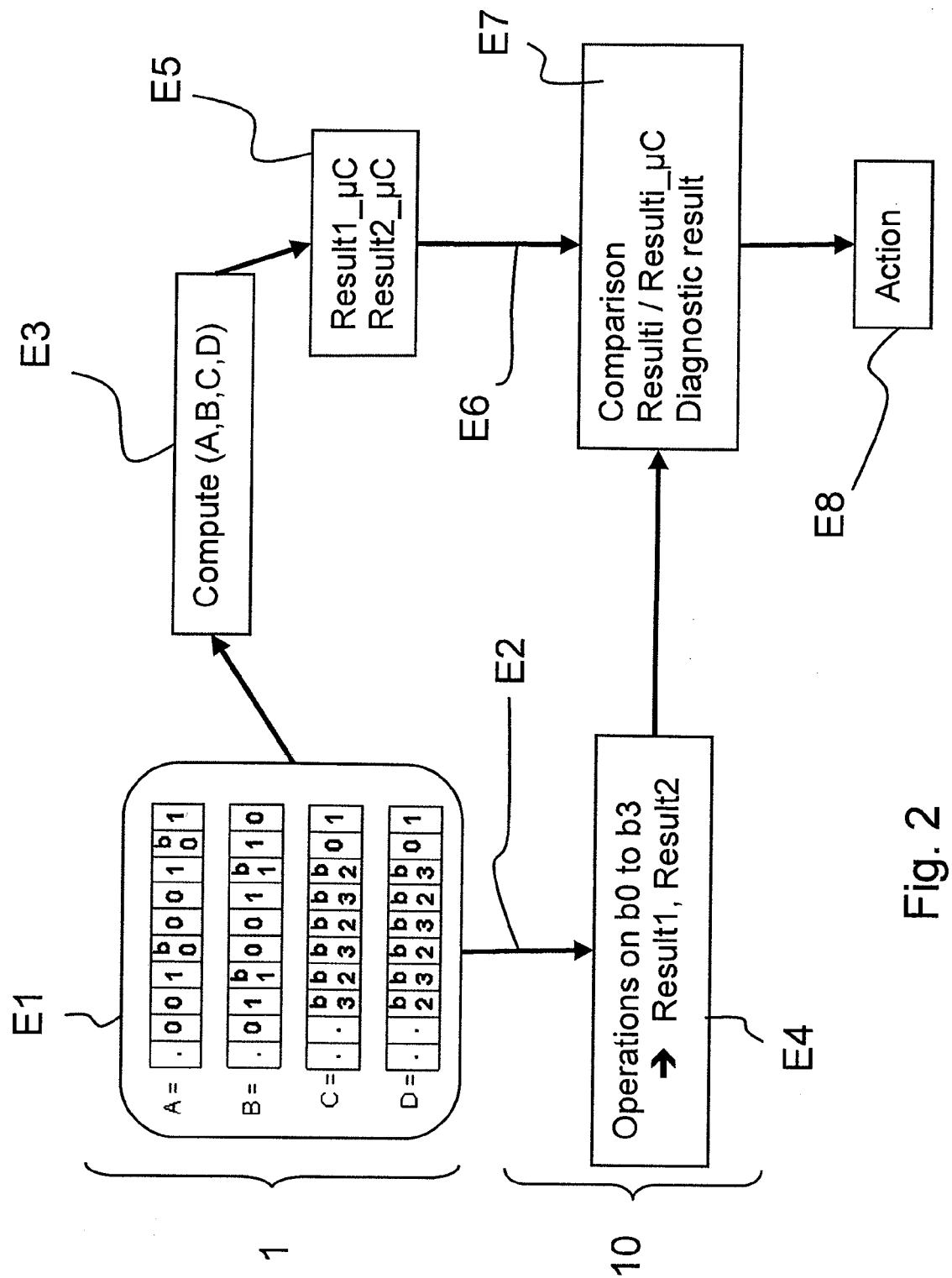
FIG. 2 is a flowchart schematically illustrating operation of the monitoring method of a microprocessor according to one embodiment of the invention.

FIG. 2 illustrates schematically, but more precisely, an implementation of the monitoring method of a microprocessor according to an embodiment of the invention.

According to this embodiment, the method is based on four numbers A, B, C, and D defined in a first step E1. These numbers vary at each repetition of the method by means of four bits of variable value noted b0, b1, b2, b3. These variable values can be variables generated randomly by the microprocessor, and/or extracted or computed from input data of the microprocessor, provided by a measurement sensor for example, choosing, for example, the last four bits of this data.

In a second step E2, the method transmits these four variable values to the monitoring device 10 by means of the communication means 16.

In a third step E3, the microprocessor performs a first computation which corresponds to the floating division of B by A, and a second computation which corresponds to multiplication of C by D, and then computes $C^2$. Advantageously, the computation performed in the microprocessor 1 is sufficiently complex to require recourse to the maximum of resources of the microprocessor 1. This computation thus advantageously integrates multiplications and/or divisions. As a variant, any other computation can be used.

Figure 3:
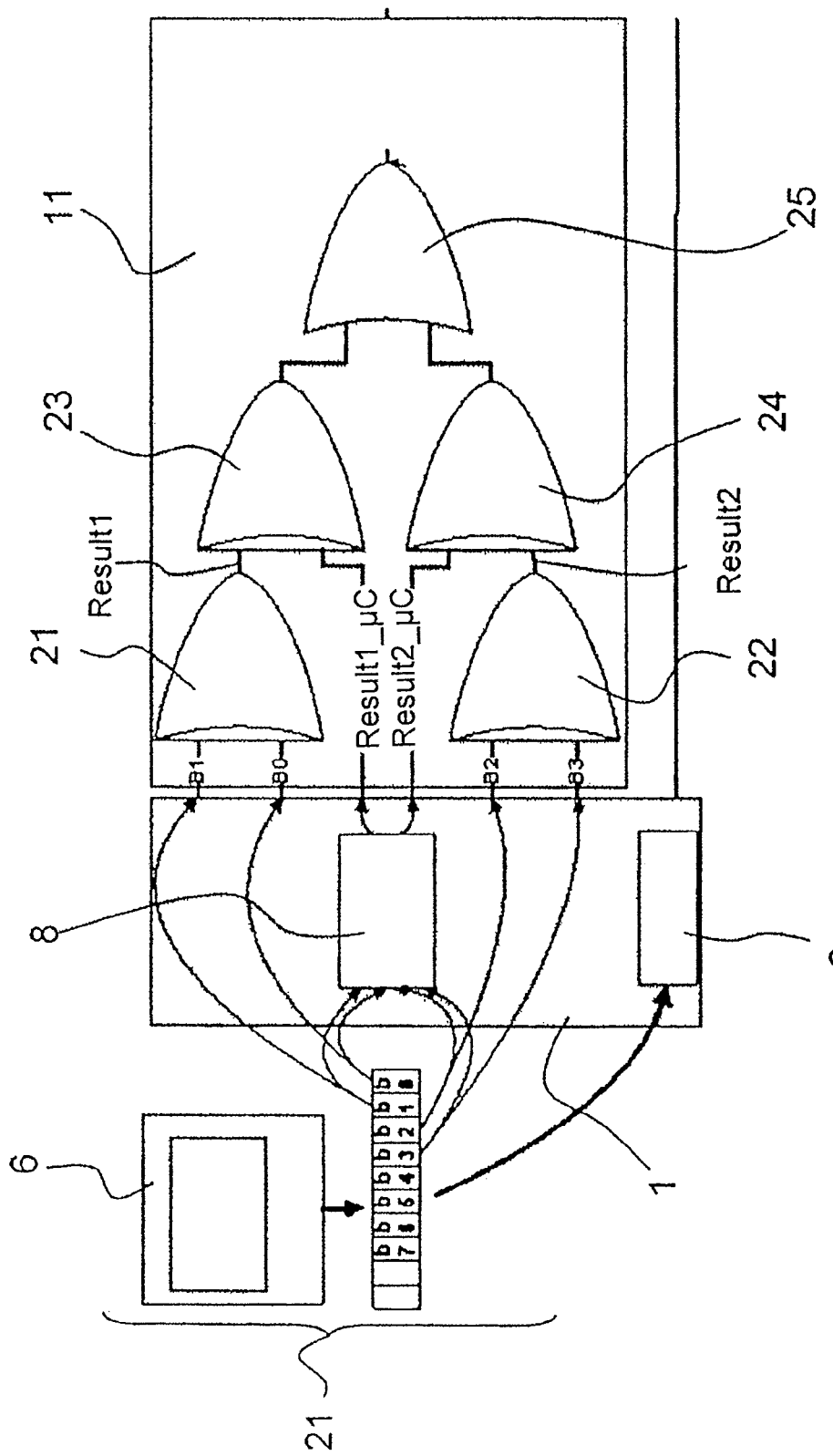
FIG. 3 represents in more detailed manner certain parts of a system equipped with a monitoring device for its microprocessor according to another embodiment of the invention.

In parallel, in a fourth step E4, the hardwired logic unit 11 of the monitoring device 10 performs two comparisons, one between b0 and b1 and the other between b2 and b3, by means of two XOR logic functions 21, 22, as indicated in FIG. 3, to define two values result1, result2, according to the following rules:

If b1=b0 then result1=0, else result1=1,
If b3=b2 then result2=0, else result2=1.

In the fifth step E5, the method determines the value of the result_µC, result2_µC data representing the results of the computations performed by the microprocessor 1, on two bits only, by the following:

If B/A=2 then result1_µC=0, else result1_µC=1,
If (C×D=$C^2$) then result2_µC=0, else result2_µC=1.

In a sixth step E6, the two results result1_µC, result2_µC are transmitted to the monitoring device 10, which performs a seventh step of comparison E7, which first comprises two new comparisons of these values with the two values result1, result2 obtained by the monitoring device 10, by means of two additional XOR functions 23, 24, the two results of which have to be equal to 0 if result1=result1_µC and if result2=result2_µC, which means that the microprocessor is operating normally and has led to the correct results result1_µC, result2_µC when performing the computations, and therefore to the correct results when performing the computations of step E3. Then a new XOR function 25 enables a single result to be determined, on one output bit, which represents the final diagnostic of the microprocessor. This result takes the value zero in the case where the following two conditions are verified: result1=result1_µC and result2=result2_µC. In other cases, this results takes the value 1.

Then the output signal representing diagnostic of the microprocessor 1 can be used directly, in a step E8, to command actuators of the system, to place the latter in a backup safety position, for example, in case of malfunctioning of the microprocessor.

The monitoring method can naturally present numerous variants without departing from the concept of the invention. In particular the computations and operations performed can differ from the examples described. Furthermore, the different steps described can be executed in different chronologies. Certain steps will preferably be performed in parallel, in substantially simultaneous manner in the microprocessor and in the monitoring device.

Thus, the inventive monitoring method comprises the following essential steps:

E3—performance of at least one computation in the microprocessor from input data;
E4—performance of at least one logic operation by hardwired and hardware components in a monitoring device from at least a part of the same input data;
E7—comparison of the results of the at least one computation made in the microprocessor and of the at least one logic operation performed in the monitoring device, to deduce therefrom a diagnostic of the microprocessor and/or a command to switch to a backup safety position.

FIG. 3 again represents the system according to the invention, including in particular detail the structure of the hardwired logic unit 11 and of the comparator unit 12 of the monitoring device 10, for implementation of the monitoring method described above. In this embodiment, the different variable values b0 to b3 are obtained for four data bits transmitted to the input of the microprocessor 1 and coming from the device 6. The hardwired logic unit 11 of the monitoring device 10 receives this data and implements the monitoring from two XOR logic gates 21, 22, whereas the comparator unit 12 comprises three XOR logic gates 23 to 25. In parallel, the microprocessor uses these variables in its diagnostic unit 8 to perform the steps described above.

The monitoring method according to the invention can be implemented with any other computation, including, for example, divisions, multiplications, raising to the square, square roots, etc. Selection and definition of the numbers A, B, C, and D form four variable values of boolean type b0, b1, b2 and b3 for input to this computation of the monitoring method which enables the result expected from computation by the microprocessor to be determined simply, without having to perform the same complex computation within the monitoring device, but by only a few logic gates only. This principle can be implemented from a different number of variable values and/or input numbers, and integrating a different number of variables, in particular of boolean type. The user may choose a trade-off between complexity of computation and the functional safety level he wishes to achieve. This principle of the invention can be used with other logic units having fewer logic gates among the following OR, NOR, AND, NAND, XOR and/or XNOR, etc. This principle of the invention can also be used with gates using sequential logic. This use of an external monitoring device performing simple operations from a structure of hardware type enables a high monitoring level of a system to be achieved in a simple, dependable, inexpensive, and non-voluminous manner.

Figure 4:
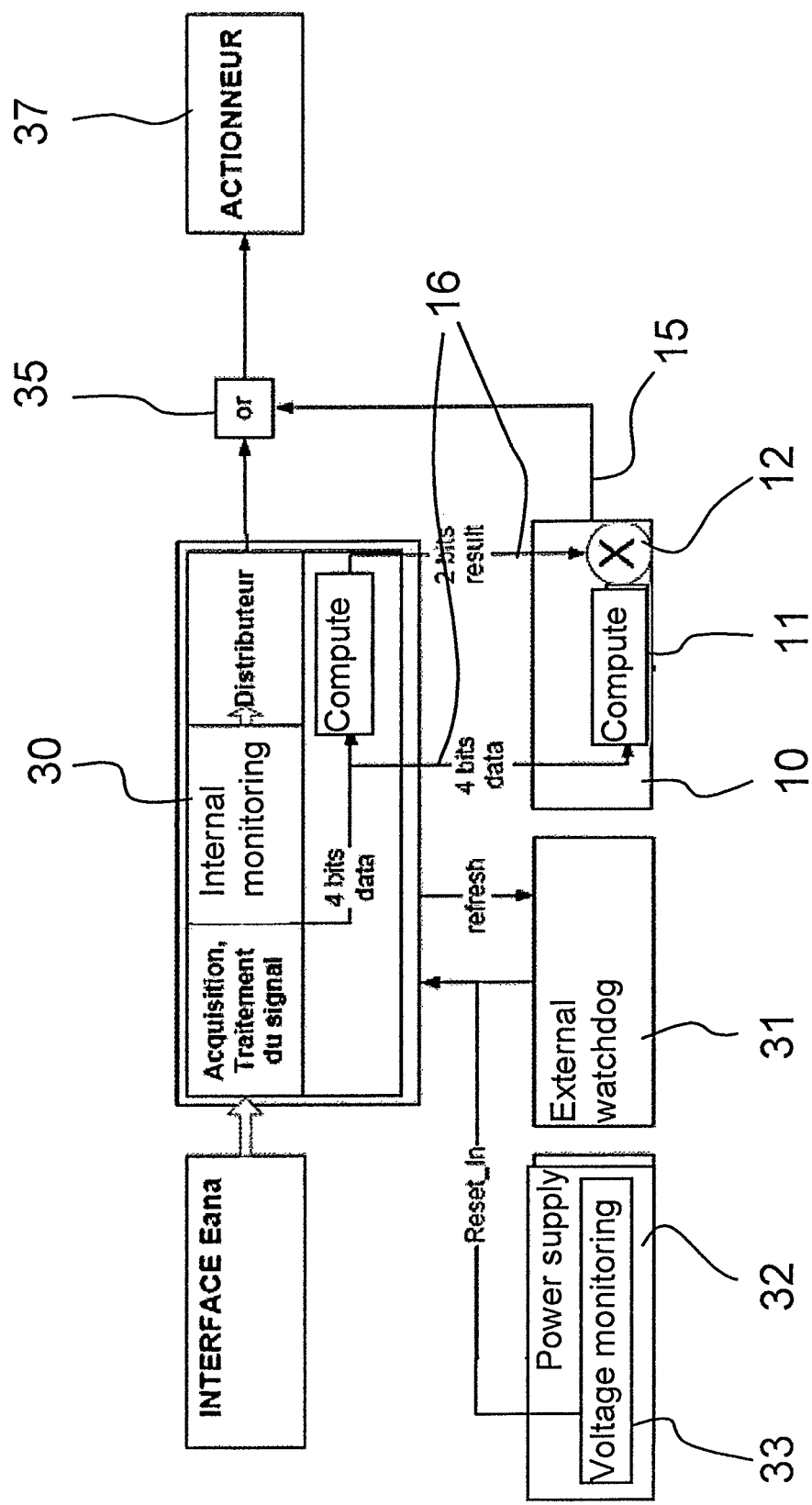
FIG. 4 represents a further alternative embodiment of the system according to the invention.

The monitoring solution according to the invention can be combined with all other existing monitoring solutions of a system, for example combined with a watchdog device. FIG. 4 thus represents an example of integration of the solution of the invention into a complex system requiring a high safety level. This system comprises a microprocessor 1 and groups several safety elements which monitor satisfactory operation of the microprocessor. It first comprises a monitoring device 10 to implement a monitoring method according to the invention. It further integrates an internal monitoring device 30, and an external monitoring device 31, which checks correct time-based operation of microprocessor, of the type described in the French Patent document FR2602618, connected to an electric power supply 32 integrating supervision 33 of the supply voltage. The system then comprises one or more logic functions 35 to command a safety action as soon as a safety device emits an alarm. This safety command acts on an actuator 37, which can, for example, place a circuit breaker, an alarm or an actuator in a backup safety position.

The monitoring device of a microprocessor according to the invention can be integrated in any system requiring a high functional safety level. It is particularly suitable for forming a circuit breaker compatible with a safety installation integrating, for example, functional safety requirements of SIL type in compliance with the IEC 61508 standard.

The concept of the invention is naturally suitable for a system comprising several microprocessors, which could comprise a monitoring device for each microprocessor, or, as a variant, a single monitoring device which could monitor several microprocessors. According to another alternative embodiment, several monitoring devices according to the invention can be associated with a single microprocessor to increase the functional safety level. Furthermore, the monitoring device of the invention has been described in relation with a microprocessor, but can be associated with any smart component integrating an Arithmetic and Logic Unit (ALU).

The invention claimed is:

1. A method of monitoring an electrical system which is equipped with a microprocessor, said method comprising:
performing in the microprocessor at least one computation on input data received at an input terminal of the microprocessor;

performing in a monitoring device, which is distinct and physically separate from the microprocessor, at least one logic operation by logic gates on the identical input data;

the microprocessor and the monitoring device performing, in parallel, said computation and/or logic operations on the identical input data;

comparing the results of said at least one computation performed on said input data in the microprocessor, with the results of said at least one logic operation performed on the identical input data in the monitoring device, and deducing from the compared results diagnostic result information about the functioning of the microprocessor; and transmitting a feedback signal to the electrical system from an output terminal of the monitoring device, wherein the feedback signal represents said diagnostic result information about the microprocessor.

2. The monitoring method according to claim 1, further comprising:

transforming in the microprocessor the input data into the form of variable values corresponding to a certain number of predefined values; and transmitting the transformed values to the monitoring device by communication means.

3. The monitoring method according to claim 2, wherein transforming the input data comprises randomly generating variable values, and/or extraction of, and/or combination of variable values, from input data bits received by the microprocessor.

4. The monitoring method according to claim 2, wherein transforming the input data comprises transforming the value of several numbers at least one bit of which is variable, into a value equal to one of the variable values.

5. The monitoring method according to claim 4, wherein performing at least one computation in the microprocessor comprises using said numbers in one or more calculations selected from the group consisting of divisions, multiplications, square roots, and raising to the square.

6. The monitoring method according to claim 5, comprising transforming at least one bit representing the results of the at least one computation performed by the microprocessor, and transmitting said at least one bit to the monitoring device.

7. The monitoring method according to claim 1, wherein performing at least one computation in the microprocessor is performed by software of a diagnostic unit of the microprocessor.

8. The monitoring method according to claim 2, wherein performance of at least one logic operation in the monitoring device comprises operations on the variable values.

9. The monitoring method according to claim 8, comprising making a comparison of the variable values from at least one XOR gate in the monitoring device to obtain results on a single bit dependent on the equality or the difference of compared variable values.

10. The monitoring method according to claim 1, wherein comparing the results comprises generation of a Boolean first value which represents a normal state of the microprocessor, and a second value which represents a malfunctioning state of said microprocessor.

11. The monitoring method according to claim 1, comprising actuating the electrical system to place it in a backup safety state when its microprocessor is in a malfunctioning state.

12. A monitoring device for an electrical system equipped with a microprocessor to be monitored, said monitoring device comprising:

at least one input terminal for receiving input data supplied to a microprocessor, which monitoring device is distinct and physically separate from, and in parallel with, microprocessor, a hardwired logic unit for independently performing in the monitoring device logic operations by logic gates on the identical input data, a comparator unit for producing comparative diagnostic information by comparing the results of an independent computation performed, in parallel, on said input data by the microprocessor with results obtained by the hardwired logic unit on the identical input data, and deducing from the comparison of said results diagnostic result information about the functioning of the microprocessor, and an output terminal of the monitoring device for transmitting to the electrical system a feedback signal representing the diagnostic result information about the microprocessor.

13. The monitoring device according to claim 12, wherein its hardwired logic unit and its comparator unit comprise logic gates of OR, NOR, AND, NAND, XOR and/or XNOR type.

14. An electrical system comprising a microprocessor and a separate monitoring device according to claim 12, which monitoring device is detectable by the microprocessor through at least one communication means.

15. The monitoring method according to claim 1, wherein the feedback signal represents a command to switch the electrical system to a backup safety position.

16. The monitoring device according to claim 12, wherein the comparitor unit is also for producing diagnostic result information in the form of a command to switch the electrical system to a backup safety position.

* * * * *